(12) United States Patent
Zeng

(10) Patent No.: US 8,638,528 B2
(45) Date of Patent: Jan. 28, 2014

(54) SLIDER AIR BEARING FOR MOBILE DRIVES

(75) Inventor: Qinghua Zeng, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 1344 days.

(21) Appl. No.: 11/351,824

(22) Filed: Feb. 9, 2006

(65) Prior Publication Data

US 2007/0183095 A1 Aug. 9, 2007

(51) Int. Cl.
*G11B 5/60* (2006.01)

(52) U.S. Cl.
USPC ................... 360/236.2; 360/236.3

(58) Field of Classification Search
USPC .......... 360/235.4, 235.5, 235.6, 236.3, 236.5, 360/235.7, 236.2
See application file for complete search history.

(56) References Cited

U.S. PATENT DOCUMENTS

| | | | | |
|---|---|---|---|---|
| 4,802,042 A * | 1/1989 | Strom | | 360/236.3 |
| 4,870,519 A * | 9/1989 | White | | 360/236.7 |
| 4,984,114 A * | 1/1991 | Takeuchi et al. | | 360/236.4 |
| 5,128,822 A | 7/1992 | Chapin et al. | | |
| 5,267,109 A * | 11/1993 | Chapin et al. | | 360/236.5 |
| 5,404,256 A | 4/1995 | White | | |
| 5,479,306 A * | 12/1995 | Ananth et al. | | 360/235.7 |
| 5,650,892 A * | 7/1997 | Dorius et al. | | 360/235.6 |
| 5,685,645 A * | 11/1997 | Nepela et al. | | 384/12 |
| RE35,800 E * | 5/1998 | Chapin | | 360/235.7 |
| 5,777,825 A | 7/1998 | Dorius | | |
| 6,021,020 A | 2/2000 | Itoh et al. | | |
| 6,034,842 A * | 3/2000 | Cha | | 360/235.6 |
| 6,055,128 A | 4/2000 | Dorius et al. | | |
| 6,069,769 A | 5/2000 | Dorius et al. | | |
| 6,072,662 A * | 6/2000 | Utsunomiya | | 360/236.1 |
| 6,317,294 B1 * | 11/2001 | Wada et al. | | 360/235.6 |
| 6,339,518 B1 * | 1/2002 | Chang et al. | | 360/235.5 |
| 6,424,495 B1 * | 7/2002 | Kobayashi et al. | | 360/236.5 |
| 6,462,909 B1 * | 10/2002 | Boutaghou et al. | | 360/235.8 |
| 6,477,013 B1 | 11/2002 | Kang et al. | | |
| 6,483,667 B1 * | 11/2002 | Berg et al. | | 360/235.6 |
| 6,525,909 B1 * | 2/2003 | Qian et al. | | 360/235.7 |
| 6,661,611 B1 | 12/2003 | Sannino et al. | | |
| 6,674,611 B2 * | 1/2004 | Bolasna et al. | | 360/236.2 |
| 6,674,612 B2 * | 1/2004 | Boutaghou et al. | | 360/236.4 |
| 6,680,821 B2 * | 1/2004 | Kang | | 360/236.2 |
| 6,683,755 B2 * | 1/2004 | Koishi | | 360/235.6 |
| 6,870,707 B1 * | 3/2005 | Zheng et al. | | 360/235.6 |
| 6,956,719 B2 * | 10/2005 | Mundt et al. | | 360/236.3 |
| 7,019,945 B1 * | 3/2006 | Peng et al. | | 360/235.7 |
| 7,245,455 B2 * | 7/2007 | Rajakumar | | 360/235.8 |
| 7,324,306 B2 * | 1/2008 | Ruiz | | 360/235.7 |
| 7,515,384 B2 * | 4/2009 | Huang | | 360/235.6 |
| 2001/0030834 A1 * | 10/2001 | Kohira et al. | | 360/235.8 |
| 2002/0008940 A1 * | 1/2002 | Jang et al. | | 360/236.3 |
| 2002/0030938 A1 | 3/2002 | Boutaghou et al. | | |
| 2002/0048120 A1 * | 4/2002 | Boutaghou et al. | | 360/236.3 |
| 2002/0145828 A1 * | 10/2002 | Mundt et al. | | 360/235.6 |
| 2003/0227717 A1 | 12/2003 | Cha et al. | | |

(Continued)

*Primary Examiner* — Brian Miller

(57) ABSTRACT

Embodiments of the present invention include a head slider for a magnetic disk drive. The head slider comprises a first recess on the air bearing surface of the head slider. The head slider further comprises a second recess on the air bearing surface, wherein the first recess is deeper than the second recess and is closer to the leading edge than the second recess and wherein the second recess is closer to the trailing edge than the first recess.

15 Claims, 6 Drawing Sheets

(56) References Cited

U.S. PATENT DOCUMENTS

| | | |
|---|---|---|
| 2004/0095680 A1 | 5/2004 | Takahashi |
| 2004/0179302 A1* | 9/2004 | Sasaki et al. ............... 360/236.3 |
| 2005/0099728 A1* | 5/2005 | Deng et al. ................. 360/236.2 |
| 2005/0135012 A1* | 6/2005 | Kubotera ................... 360/236.3 |

* cited by examiner

SLIDER AIR BEARING FOR MOBILE DRIVES

TECHNICAL FIELD

The field of the present invention relates to disk drive data storage devices. More particularly, embodiments of the present invention are related to altitude sensitivity and shock sensitivity of a mobile disk drive.

BACKGROUND ART

Disk drives used in small electronic devices such as laptops, MP3 players, GPS, PDA devices and other devices are "mobile drives." Slider air bearing is a key component of these "mobile drives." Some of the requirements of these "mobile drives" include "low altitude sensitivity" and "high operational shock" performances.

The low altitude sensitivity means that the slider air bearing has a small fly height (FH) loss at a higher altitude (such as 3000 meters) compared to the FH at sea level. The requirement for a small FH loss becomes more important for current drives with sub 10 nanometer FH. The high operational shock requirement means that the slider air bearing would not collapse and the slider/disk interface damage would not occur during operating state when the drive experiences a very high acceleration such as impact, free drop, etc. The highest acceleration value without the interface damage is called the "op-shock" boundary. Current specification for the op-shock boundary is approximately 200 G and 2 ms duration, however, the specification is getting higher, such as 400 G/2 ms.

To reduce FH loss, a low base recess (low depth etch) or a dimple forward slider is used. However, a low base recess reduces op-shock performance and the dimple forward design degrades the op-shock also. A deeper base recess increases op-shock performance, however, the FH loss suffers drastically. The requirements of high op-shock and low FH loss are at conflict. Conventionally, FH loss has been minimized at the expense of high op-shock degradation.

SUMMARY OF THE INVENTION

Embodiments of the present invention include a head slider for a magnetic disk drive. The head slider comprises a first base recess on the air bearing surface of the head slider. The head slider further comprises a second base recess on the air bearing surface, wherein the first recess is deeper than the second recess and is closer to the leading edge than the second recess and wherein the second recess is closer to the trailing edge than the first recess.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiments of the present invention, a slider air bearing for mobile drives, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
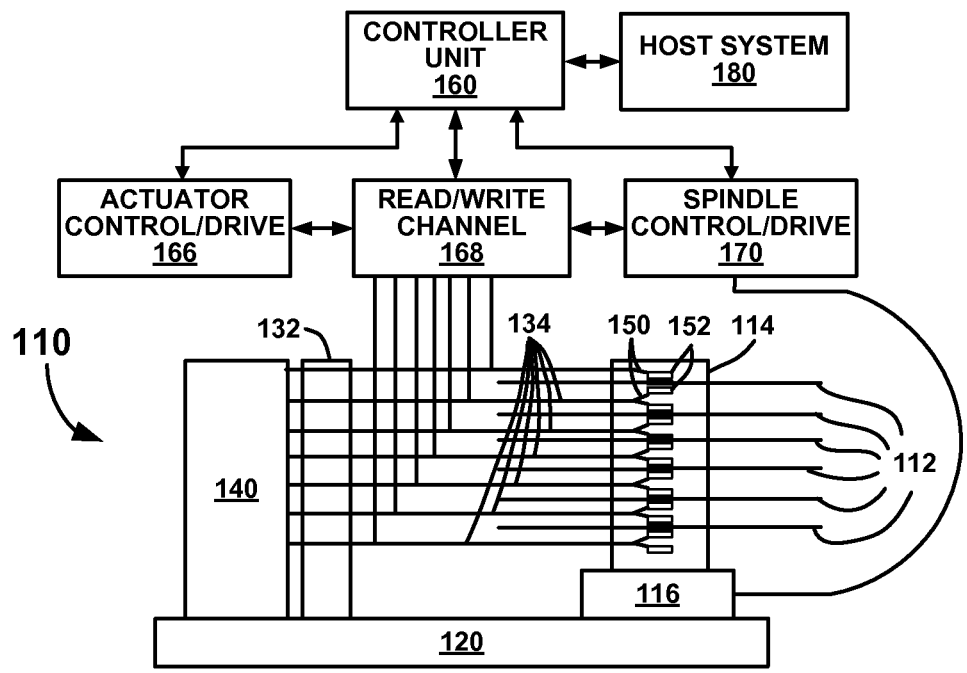
FIG. 1 is a side view of an exemplary disk drive system in accordance with embodiments of the present invention.
Figure 2:
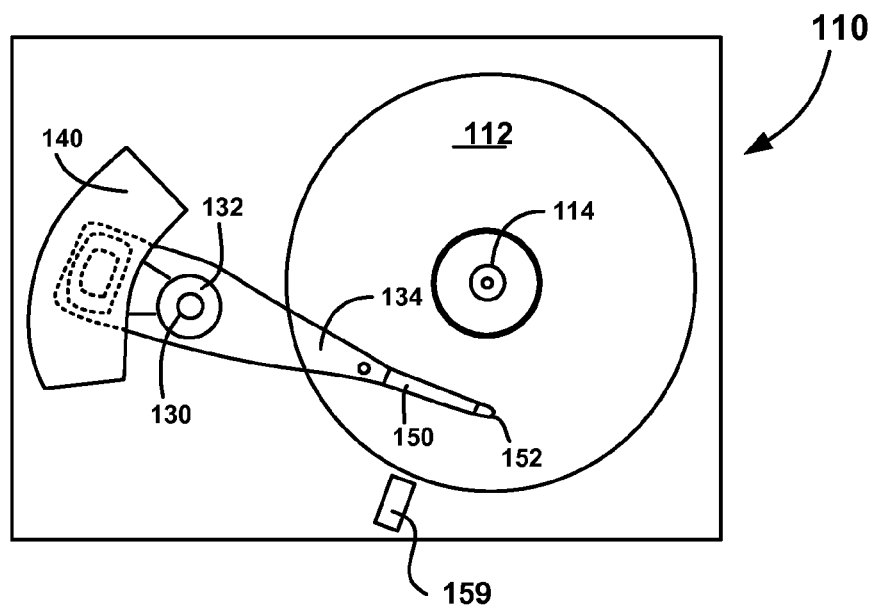
FIG. 2 is a top view of an exemplary disk drive system in accordance with embodiments of the present invention.

FIGS. 1 and 2 show a side and a top view, respectively, of a disk drive system designated by the general reference number 110. In one embodiment of the invention, disk drive system 110 is a mobile disk drive for use in a mobile or portable electronic device. The disk drive system 110 comprises a plurality of stacked magnetic recording disks 112 mounted to a spindle 114. The disks 112 may be conventional particulate or thin film recording disks or, in other embodiments, they may be liquid bearing disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134. A load/unload ramp 159 prevents contact between the disk 112 and the slider 152 during loading and unloading of the actuator arms 134.

A plurality of suspension assemblies 150 are attached to the actuator arms 134. A plurality of transducer heads, or sliders 152 are attached respectively to the suspension assemblies 150. The sliders 152 are located proximate to the disks 112 so that, during operation, they are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. Furthermore, controller unit 160 is connected to spindle control/drive 170 that in turn is connected to spindle motor 116. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180.

Embodiments of the present invention use multiple etch depths on the air bearing surface of a disk drive slider to improve fly height loss while improving shock resistance. More particularly, embodiments of the present invention include a disk drive slider with a deeper recess close to the leading edge of the slider than the trailing edge of the slider. Embodiments of the present invention are directed towards disk drives for use in portable electronic devices, however, the present invention is well suited to any disk drive system.

Figure 3:
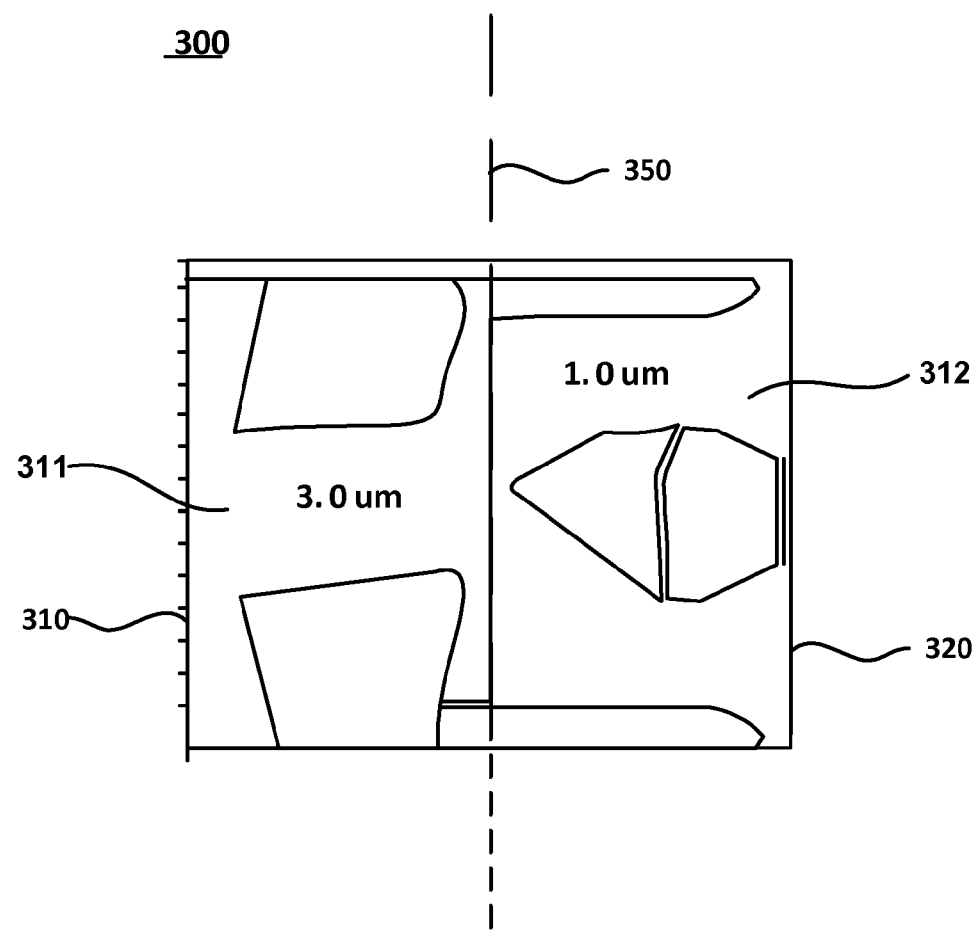
FIG. 3 is a bottom view of a first exemplary disk drive slider comprising a first etch depth close to a leading edge and a second etch depth close to a trailing edge wherein the first etch depth is greater than the second etch depth in accordance with embodiments of the present invention.

FIG. 3 is a bottom view of a first disk drive slider 300 (e.g., the air bearing surface) with a deeper recess close to the leading edge 310 in accordance with embodiments of the present invention. In one embodiment of the invention, the disk drive slider 300 can be divided into two portions, a leading edge 310 and a trailing edge 320. The leading edge 310 is the front of the slider with respect to a rotating disk surface (not shown). A portion of the rotating disk passes first under the leading edge 310 then under the trailing edge 320. In one embodiment of the invention, the leading edge 310 comprises a deeper recess than the trailing edge 320. In one embodiment of the invention, the leading edge 310 comprises a first etch depth 311 of approximately three microns and the trailing edge 320 comprises a second etch depth 312 of approximately one micron. In another embodiment of the invention, the leading edge 310 comprises a first etch depth 311 of approximately 2-3.5 microns and the trailing edge comprises a second etch depth 312 of approximately 0.5-1.5 microns.

In one embodiment of the invention, the recess depth is dependent on the disk speed. For example, with a 7200 rpm disk speed and a 2.5" diameter disk, the second (trailing) recess is approximately 0.6-1.5 microns in depth and the first (leading) recess is approximately 2-3 microns in depth. Alternatively, with a 3600 rpm disk speed, and a 1" diameter disk, the second (trailing) recess is approximately 0.5-0.95 microns in depth and the first (leading) recess is approximately 1.0-1.5 microns in depth.

In one embodiment of the invention, the leading edge 310 and the trailing edge 320 are equal in size (meaning the transition from the leading edge 310 to the trailing edge 320 is defined by bisect line shape 350 of the slider 300 length). In another embodiment of the invention, bisect shape 350 between 310 and 320 is not at centerline. For example, bisect shape 350 can be closer to the leading edge 310 or the trailing edge 320. In another embodiment of the invention, the bisect shape 350 can be curved.

In accordance with embodiments of the present invention, slider 300, comprising a deeper etch depth on the leading side 310 than on the trailing side 320, increases the shock performance over conventional sliders while maintaining FH loss at altitude. For example, the disk slider 300 of the present invention maintains a fly height of approximately 10 nanometers even at altitudes of 3000 meters while improving shock resistance (e.g., shock boundary) over conventional slider designs.

Figure 4A:
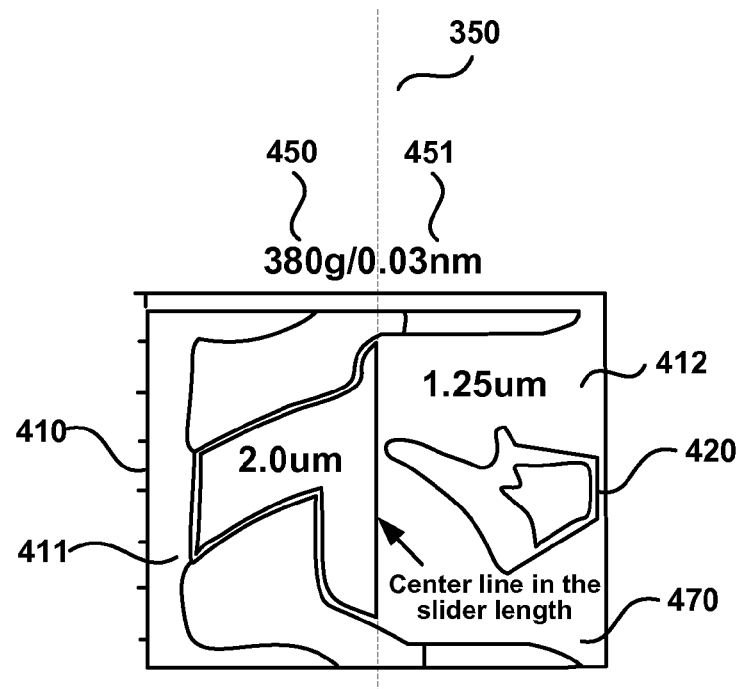
FIG. 4A is a bottom view of a second exemplary disk drive slider comprising a first etch depth close to a leading edge and a second etch depth close to a trailing edge wherein the first etch depth is greater than the second etch depth in accordance with embodiments of the present invention.

FIG. 4A is an illustration of a second exemplary slider 400a comprising a plurality of etch depths wherein the leading edge 410 comprises a deeper etch depth than the trailing edge 420 in accordance with embodiments of the present invention. The leading edge 410 of slider 400a comprises a first etch depth 411 of approximately 2 micrometers and the trailing edge 420 comprises a second etch depth 412 of approximately 1.25 micrometers. The centerline 470 bisects the slider length and defines the boundary between the leading edge 410 and the trailing edge 420. In this embodiment of the invention, the slider comprises a shock boundary 450 of approximately 380 G and a fly height loss 451 of approximately .03 nanometers at approximately three thousand meters above sea level.

Figure 4B:
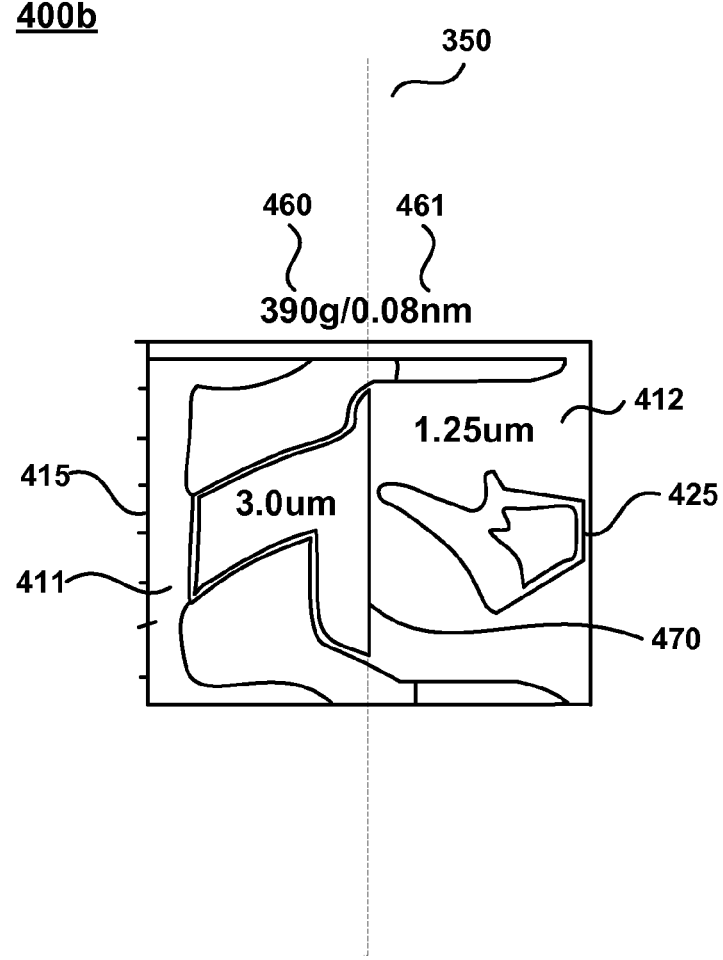
FIG. 4B is a bottom view of a first exemplary disk drive slider comprising a first etch depth close to a leading edge and a second etch depth close to a trailing edge wherein the first etch depth is greater than the second etch in accordance with embodiments of the present invention.

FIG. 4B is an illustration of a third exemplary slider 400b comprising a plurality of etch depths wherein the leading edge 415 comprises a deeper etch depth than the trailing edge 425 in accordance with embodiments of the present invention. The leading edge 415 of slider 400b comprises a first etch depth 411 of approximately 3 micrometers and the trailing edge 425 comprises a second etch depth 412 of approximately 1.25 micrometers. The centerline 470 bisects the slider length and defines the boundary between the leading edge 415 and the trailing edge 425. In this embodiment of the invention, the slider comprises a shock boundary 460 of approximately 390 G and a fly height loss 461 of approximately .08 nanometers at approximately three thousand meters above sea level.

Figure 4C:
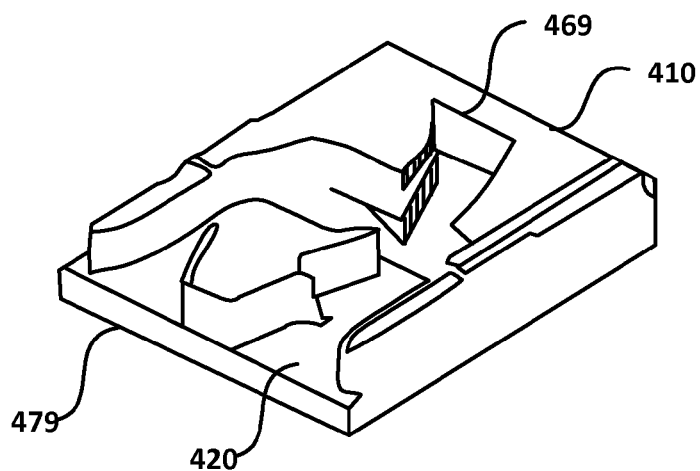
FIG. 4C is a three-dimensional illustration of an exemplary disk drive slider comprising a deeper base etch close to a leading edge and a shallower base etch close to a trailing edge in accordance with embodiments of the present invention.

FIG. 4C is a three-dimensional illustration of an exemplary disk drive slider 400c comprising a deeper etch depth 469 on a leading edge 410 and a shallower etch depth 479 on a trailing edge 420 in accordance with embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head slider for a magnetic disk drive, said slider comprising a leading edge and a trailing edge of an air bearing surface, said head slider further comprising:

a first etch depth formed on said air bearing surface of said head slider, wherein said first etch depth is near a leading edge and a perimeter of said first etch depth is separated from said leading edge; and a second etch depth formed on said air bearing surface of said head slider wherein said first etch depth is deeper than said second etch depth, wherein said second etch depth extends from said trailing edge, and wherein said first etch depth is adjacent said second etch depth along a centerline of said head slider, wherein said first etch depth is from said air bearing surface and said second etch depth is from said air bearing surface, wherein said centerline divides said head slider into a leading side of said air bearing surface and a trailing side of said air bearing surface and wherein said second etch depth is completely on said trailing side of said air bearing surface and wherein said first etch depth is completely on said leading side of said air bearing surface.

2. The head slider as described in claim 1 wherein said second recess is approximately one micrometer in depth with respect to a bottom of said air bearing surface of said head slider.

3. The head slider as described in claim 1 wherein said first etch depth is approximately two or three micrometers in depth with respect to a bottom of said air bearing surface of said head slider.

4. The head slider as described in claim 1 wherein said second etch depth is between 1 and 1.5 micrometers in depth and said first etch depth is between 2 and 3.5 micrometers in depth.

5. The head slider as described in claim 1 wherein said head slider is for a mobile disk drive assembly.

6. A disk drive assembly comprising:
   a rotatable magnetic disk; and
   a head gimbal assembly coupled to an actuator, said head gimbal assembly comprising a head slider, said slider comprising:
      an air bearing surface comprising a leading edge and a trailing edge;
      a first etch depth formed on said air bearing surface of said head slider, wherein said first etch depth is near a leading edge and a perimeter of said first etch depth is separated from said leading edge; and
      a second etch depth formed on said air bearing surface of said head slider wherein said first etch depth is deeper than said second etch depth, wherein said second etch depth extends from said trailing edge, and wherein said first etch depth is adjacent said second etch depth along a centerline of said head slider, wherein said first etch depth is from said air bearing surface and said second etch depth is from said air bearing surface, wherein said centerline bisects said head slider into a leading side of said air bearing surface and a trailing side of said air bearing surface and wherein said second etch depth is completely on said trailing side of said air bearing surface and wherein said first etch depth is completely on said leading side of said air bearing surface.

7. The disk drive assembly as described in claim 6 wherein said second recess is approximately one micrometer in depth with respect to a bottom of said air bearing surface of said head slider.

8. The disk drive assembly as described in claim 6 wherein said first etch depth is approximately two or three micrometers in depth with respect to a bottom of said air bearing surface of said head slider.

9. The disk drive assembly as described in claim 6 wherein said second etch depth is between 1 and 1.5 micrometers in depth and said first etch depth is between 2 and 3.5 micrometers in depth.

10. The disk drive assembly as described in claim 6 wherein a depth of said first etch depth and a depth of said second etch depth are dependent on a rotational speed and diameter of said magnetic disk or disk linear velocity, wherein said depths are smaller with a lower disk velocity.

11. A head gimbal assembly comprising a head slider for reducing fly height loss at altitude and for increasing shock protection, said head slider comprising:
    an air bearing surface comprising a leading edge and a trailing edge;
    a first etch depth formed on said air bearing surface of said head slider, wherein said first etch depth is near said leading edge and a perimeter of said first etch depth is separated from said leading edge; and
    a second etch depth formed on said air bearing surface of said head slider wherein said first etch depth is deeper than said second etch depth, wherein said second etch depth extends from said trailing edge, and wherein said first etch depth is adjacent said second etch depth along a centerline of said head slider, wherein said first etch depth is from said air bearing surface and said second etch depth is from said air bearing surface, wherein said centerline bisects said head slider into a leading side of said air bearing surface and a trailing side of said air bearing surface and wherein said second etch depth is completely on said trailing side of said air bearing surface and wherein said first etch depth is completely on said leading side of said air bearing surface.

12. The head gimbal assembly as described in claim 11 wherein said second recess is approximately one micrometer in depth with respect to a bottom of said air bearing surface of said head slider.

13. The head gimbal assembly as described in claim 11 wherein said first etch depth is approximately two or three micrometers in depth with respect to a bottom of said air bearing surface of said head slider.

14. The head gimbal assembly as described in claim 11 wherein said second etch depth is between 1 and 1.5 micrometers in depth and said first etch depth is between 2 and 3.5 micrometers in depth.

15. The head gimbal assembly as described in claim 11 wherein a depth of said first etch depth and a depth of said second etch depth are dependent on a rotational speed and diameter of a magnetic disk or a disk linear velocity, wherein said depths are smaller at a lower disk velocity.

* * * * *